US012055828B2

(12) United States Patent
Hu et al.

(10) Patent No.: US 12,055,828 B2
(45) Date of Patent: Aug. 6, 2024

(54) ARRAY SUBSTRATE AND DISPLAY PANEL

(71) Applicant: HKC CORPORATION LIMITED, Shenzhen (CN)

(72) Inventors: Hong Hu, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/067,933

(22) Filed: Dec. 19, 2022

(65) Prior Publication Data

US 2023/0384641 A1 Nov. 30, 2023

(30) Foreign Application Priority Data

May 30, 2022 (CN) ......................... 202210597761.4

(51) Int. Cl.

| | |
|---|---|
| ***G02F 1/1362*** | (2006.01) |
| ***G02F 1/1343*** | (2006.01) |
| ***G02F 1/1368*** | (2006.01) |

(52) U.S. Cl.

CPC .. *G02F 1/136204* (2013.01); *G02F 1/134309* (2013.01); *G02F 1/13439* (2013.01); (Continued)

(58) Field of Classification Search

CPC ............. G02F 1/1333; G02F 1/133345; G02F 1/1335; G02F 1/133512; G02F 1/1343; G02F 1/134309; G02F 1/134363; G02F 1/13439; G02F 1/1362; G02F 1/136209; G02F 1/136218; G02F 1/136222; G02F 1/136286; G02F 1/1368; G02F 2201/40

See application file for complete search history.

(56) References Cited

U.S. PATENT DOCUMENTS

2003/0128323 A1* 7/2003 Matsumoto ....... G02F 1/134363 349/141

FOREIGN PATENT DOCUMENTS

| | | |
|---|---|---|
| CN | 1434338 | 8/2003 |
| CN | 104597643 | 5/2015 |
| CN | 110824795 | 2/2020 |

OTHER PUBLICATIONS

CNIPA, First Office Action for CN Application No. 202210597761.4, Jul. 8, 2022.

(Continued)

*Primary Examiner* — Thoi V Duong

(74) *Attorney, Agent, or Firm* — Hodgson Russ LLP

(57) ABSTRACT

An array substrate includes a first substrate, a driver layer and a transparent electrode layer. The transparent electrode layer is provided at a side of the driver layer away from the first substrate in an insulating manner. The driver layer includes a data line. The transparent electrode layer includes a plurality of electric field generating patterns arranged in an array and an electric field shielding pattern located between adjacent two columns of electric field generating patterns. The electric field generating pattern includes a plurality of common electrode bars and a plurality of pixel electrode bars alternately arranged in a row direction and provided with a first gap therebetween. The electric field shielding pattern is spaced from the electric field generating pattern and is used for writing the same common potential as the common electrode bar. The electric field shielding pattern covers the data line.

16 Claims, 5 Drawing Sheets

(52) U.S. Cl.
CPC .. *G02F 1/136209* (2013.01); *G02F 1/136218* (2021.01); *G02F 1/136286* (2013.01); *G02F 1/1368* (2013.01); *G02F 1/136222* (2021.01); *G02F 2201/40* (2013.01)

(56) References Cited

OTHER PUBLICATIONS

CNIPA, First Office Action for CN Application No. 202210597761.4, Aug. 3, 2022.

* cited by examiner

ARRAY SUBSTRATE AND DISPLAY PANEL

CROSS-REFERENCE TO RELATED APPLICATION

This application claims priority to Chinese Patent Application No. 202210597761.4, filed May 30, 2022, the entire disclosure of which is incorporated herein by reference.

FIELD OF TECHNOLOGY

The present disclosure relates to the field of display technology and, more particularly, to an array substrate and a display panel.

BACKGROUND

At present, the liquid crystal display panel needs to use the black matrix (BM) on the counter substrate to shield the metal traces such as data lines on the array substrate, but this will reduce the aperture ratio. In addition, there are a series of problems such as poor alignment accuracy of BM, which leads to poor overall display effect.

SUMMARY

There are provided an array substrate and a display panel according to embodiments of the present disclosure. The technical solution is as below:

According to a first aspect of the present disclosure, there is provided an array substrate including a first substrate; a driver layer including a data line; and a transparent electrode layer provided at a side of the driver layer away from the first substrate in an insulating manner,

- the transparent electrode layer includes a plurality of electric field generating patterns arranged in an array and an electric field shielding pattern located between adjacent two columns of electric field generating patterns, the electric field generating pattern including a plurality of common electrode bars and a plurality of pixel electrode bars alternately arranged in a row direction with a first gap therebetween; the electric field shielding pattern is spaced from the electric field generating pattern, and the electric field shielding pattern is configured for writing the same common potential as the common electrode bar;
- the electric field shielding pattern covers the data line; and in the row direction, opposite sides of the data line are inwardly retracted with respect to two sides of the electric field shielding pattern.

According to a second aspect of the present disclosure, there is provided a display panel including a counter substrate and a liquid crystal layer, wherein the display panel further includes the array substrate as described in any of the above, wherein the array substrate and the counter substrate are arranged by cell assembling, and the liquid crystal layer is sandwiched between the array substrate and the counter to substrate;

- the counter substrate further includes a second substrate and a black matrix located on one side of the second substrate close to the array substrate, and orthographic projections of the black matrix and the electric field shielding pattern on the first substrate do not overlap.

It should be understood that the above general description and the following detailed description are exemplary and explanatory only and are not intended to limit the present disclosure.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure. Obviously, the drawings in the following description are merely some embodiments of the present disclosure, from which other drawings may be obtained without exerting inventive effort by those ordinarily skilled in the art.

DETAILED DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present disclosure will be more comprehensive and complete, and the concept of example embodiments will be fully communicated to those skilled in the art.

In the disclosure, the terms of "first", "second" are for descriptive purposes only and cannot be construed as indicating or implying relative importance or implying the number of the indicated technical features. Thus, features defined with "first" and "second" may explicitly or implicitly include one or more of the features. In the description of the present disclosure, "multiple" means two or more unless otherwise expressly specified.

Further, the described features, structures or characteristics may be incorporated in any suitable manner in one or more embodiments. In the following description many specific details are provided to give a full understanding of the embodiments of the present disclosure. However, those skilled in the art will appreciate that the technical aspects of the present disclosure may be practiced without one or more of the specific details, or other methods, components, devices, steps and the like may be employed. In other instances, the common methods, devices, implementations or operations are not shown or described in detail to avoid obscuring aspects of the present disclosure.

Embodiment 1

The embodiment of the present disclosure provides an array substrate which can be applied to a liquid crystal display panel. For example, the liquid crystal display panel of this embodiment may be of an IPS (In-Plane Switching) type. It should be understood that the liquid crystal display panel of this embodiment is applied to the normally black display mode and is normally black when the pixels are not turned on.

Figure 1:
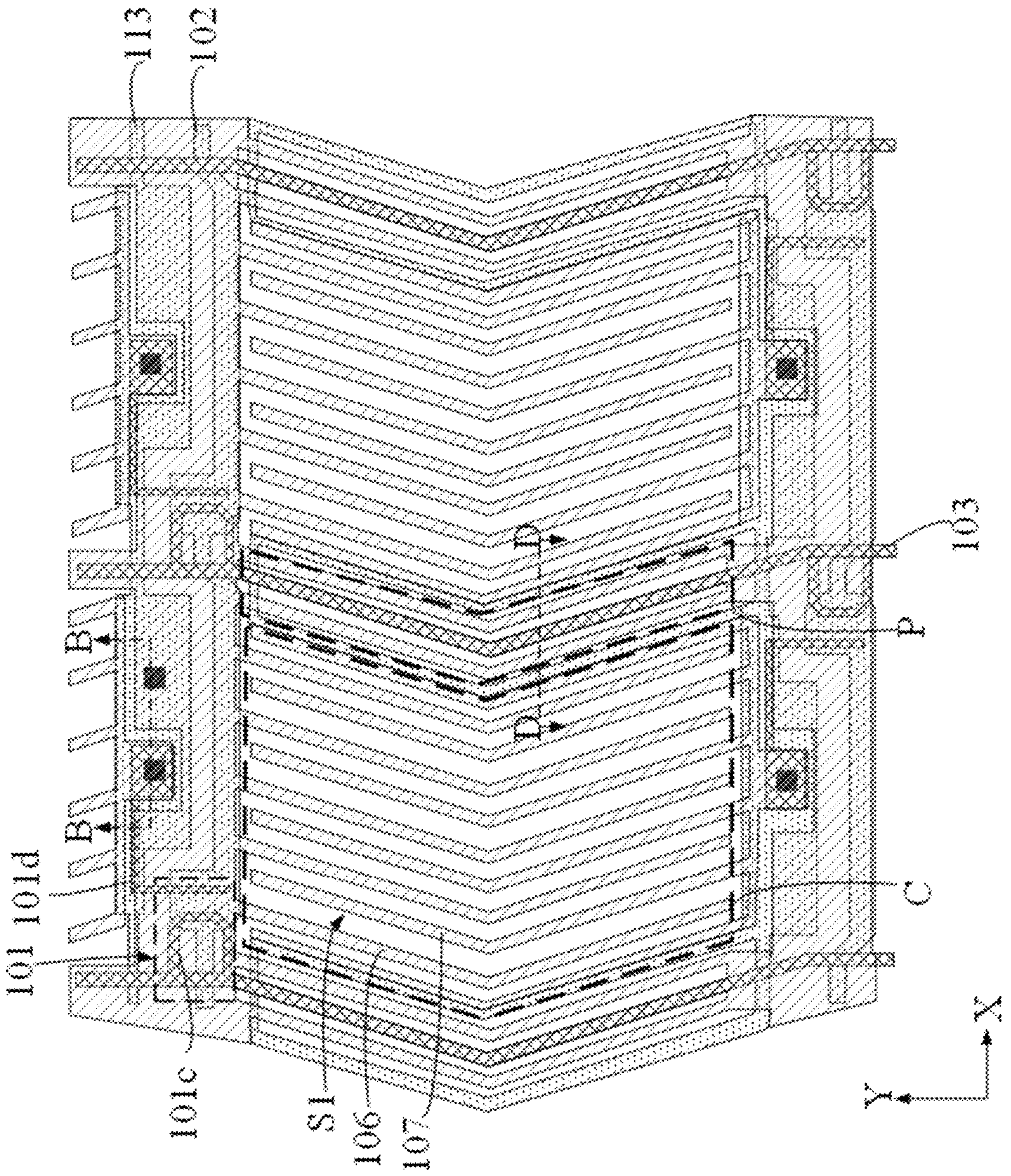
FIG. 1 is a plan view of an array substrate according to embodiment 1 of the present disclosure.
Figure 2:
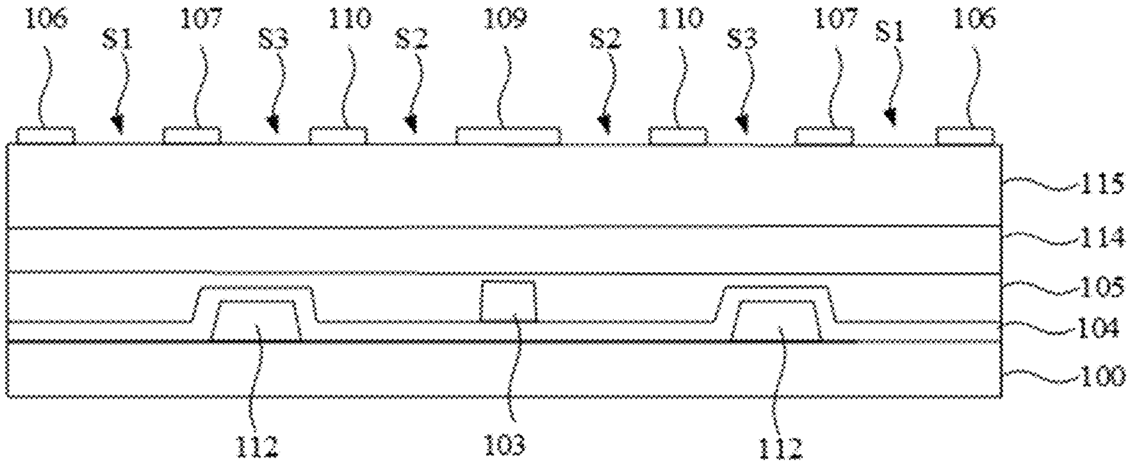
FIG. 2 is a sectional view in a D-D direction shown in FIG. 1.

Specifically, the array substrate of this embodiment is described in detail with reference to FIGS. 1, FIG. 2 and FIG. 5.

The array substrate may include a first substrate 100, a driver layer and a transparent electrode layer. The driver layer may include a transistor 101, a scan line 102, a data line 103 and the like.

The first substrate 100 may be a single-layer structure such as a glass substrate, but is not limited thereto, and may be a composite structure in which a plurality of materials are stacked, and will not be described in detail herein.

The scan line 102 is provided on the first substrate 100. The scan line 102 as a whole can be considered as extending in a row direction X. A plurality of rows of scan line 102 can be provided and arranged at intervals.

The data line 103 is provided on the first substrate 100. The data line 103 as a whole can be considered as extending in a column direction Y. A plurality of columns of data line 103 can be provided and arranged at intervals. The data line 103 may be located on one side of the scan line 102 away from the first substrate 100, that is, the data line 103 may be fabricated on the first substrate 100 after the scan line 102 is fabricated, and the data line 103 is insulated from the scan line 102, that is, a gate insulating layer 104 is disposed between the data line 103 and the scan line 102.

For example, the scan line 102, the data line 103 and the like may be made of a metal material including, for example, copper, molybdenum, aluminum, titanium and the like to ensure good electrical conductivity, but are not limited thereto, and may be made of other materials having good electrical conductivity.

The transistor 101 may be located on a side of the transparent electrode layer close to the first substrate 100, and the transistor 101 may include an active layer, a gate, a source 101*c* and a drain 101*d*. The gate may be provided in the same layer as and connected to the scan line 102, and it should be understood that the gate may also be formed by a partial structure of the scan line 102, that is, a partial region of the scan line 102 corresponding to the active layer may be used to form the gate of the transistor 101, and the source 101*c*, the drain 101*d* and the data line 103 may be provided in the same layer, wherein the source 101*c* is connected to the data line 103.

It should be understood that, in the present disclosure, "provided in the same layer" refers to a layer structure in which a layer for forming a specific pattern is formed by the same film forming process and then formed by one patterning process using the same mask. That is, the one patterning process corresponds to a mask. Depending on the specific graphics, one patterning process may include multiple exposure, development or etching processes, and the specific patterns in the formed layer structure may be continuous or discontinuous, and these specific patterns may also be at different heights or have different thicknesses, thus simplifying the manufacturing process, saving manufacturing costs and improving production efficiency.

For example, the transistor 101 of this embodiment may be of a bottom gate type. When the transistor 101 is of the bottom gate type, the gate may be located on the side of the active layer close to the first substrate 100, and the gate insulating layer 104 may be arranged between the active layer and the gate. The source 101*c* and the drain 101*d* are directly overlapped with a source doped region and a drain doped region at both ends of the active layer, respectively, but it is not limited thereto, the transistor 101 may also be of a top gate type depending on the specific case.

The transparent electrode layer may be provided on a side of the driver layer away from the first substrate 100 in an insulating manner, that is, the transparent electrode layers fabricated on the first substrate 100 after the driver layer is made, and a passivation layer 105 is provided between the transparent electrode layer and the driver layer. For example, the transparent electrode layer may be made of a transparent conductive material such as indium tin oxide (ITO), indium zinc oxide (IZO), zinc oxide (ZnO), etc.

The transparent electrode layer includes a plurality of electric field generating patterns C arranged in an array and an electric field shielding pattern P positioned between adjacent two columns of electric field generating patterns C. The electric field generating pattern C is used for forming an electric field when the pixel operates so that liquid crystal molecules corresponding to the electric field generating pattern C are deflected and light rays can pass through therefrom. The electric field shielding pattern P is used for electric field shielding, so the liquid crystal molecules above the region do not deflect when the pixel operates, so that the shielding effect can be achieved. That is to say, the embodiment of the present disclosure achieves the electric field shielding in part of the region by using the transparent electrode layer to achieve the shielding effect, which can reduce the use of BM on the counter substrate.

Specifically, the electric field generation pattern C may include a plurality of common electrode bars 106 and a plurality of pixel electrode bars 107.

The pixel electrode bar 107 may be connected to the drain 101*d* of the transistor 101 to write a pixel potential. The electric field generation pattern C may include a pixel signal conductive bar 108. The pixel signal conductive bar 108 is used for connecting each pixel electrode bar 107 between adjacent two data lines 103 to form a pixel electrode. The pixel signal conductive bar 108 may be connected to the drain 101*d* of the transistor 101, in particular by a via hole passing through them.

The common electrode bar 106 is used for writing a common potential, the common electrode bar 106 and the pixel electrode bar 107 are alternately arranged in the row direction X, and a first gap S1 is provided between the common electrode bar 106 and the pixel electrode bar 107, so that a horizontal electric field can be formed between the pixel electrode bar 107 and the common electrode bar 106, and the corresponding liquid crystal molecules are deflected.

The electric field shielding pattern P and the electric field generating pattern C are provided at intervals, and the electric field shielding pattern P is used for writing the same common potential as the common electrode bar 106. In other words, the electric field shielding pattern P has a common potential everywhere and has no pixel potential, so that no electric field is formed, and the liquid crystal molecules do not deflect here.

The electric field shielding pattern P covers the data line 103. In this embodiment, the data line 103 is designed under the electric field shielding pattern P of the transparent electrode layer, which is beneficial for the electric field shielding pattern P to have the same common potential everywhere, so that no matter what kind of potential is provided by the pixel electrode bar 107, the liquid crystal molecules corresponding to the electric field shielding pattern P basically do not rotate. The liquid crystal molecules do not rotate, indicating that a phase of polarized light does not change, however, the polarized light that passes through a lower polarizer cannot pass through an upper polarizer without a change in phase in the normally black mode in the liquid crystal display panel. Therefore, the electric field shielding pattern P plays the role of black matrix (BM) and shields light. This design can reduce the use of BM for shielding data lines 103, reduce a series of process problems caused by BM alignment accuracy, and has great significance for improving panel manufacturing process and panel quality. In addition, since the use of BM for shielding the data lines 103 is reduced, the pixel aperture ratio can also be appropriately increased.

Specifically, in the row direction X, the opposite sides of the data line 103 are inwardly retracted with respect to the opposite sides of the electric field shielding pattern P, thereby further ensuring that the data line 103 is located in a region where there is no electric field and the liquid crystal molecules are not deflected, thereby ensuring the effect of shielding light by using the electric field shielding pattern P.

In this embodiment, the electric field shielding pattern P may include a first shielding electrode bar 109 for writing the common potential, and the first shielding electrode bar 109 may cover the data line 103. In the row direction X, the opposite sides of the data line 103 are inwardly retracted relative to the opposite sides of the first shielding electrode bar 109, so as to ensure the area of the electric field shielding pattern P and better achieve the light shielding effect.

Alternatively, the electric field shielding pattern P of this embodiment may further include second shielding electrode bars 110 located on opposite sides of the first shielding electrode bar 109 in the row direction X. The second shielding electrode bar 110 is used for writing the common potential. Since the same common potential is written between the second shielding electrode bar 110 and the first shielding electrode bar 109, there is no electric field between the second shielding electrode bar 110 and the first shielding electrode bar 109, that is, the liquid crystal molecules do not deflect here, and the shielding effect is achieved.

The second shielding electrode bar 110 and the first shielding electrode bar 109 have a second gap S2 therebetween, that is, orthographic projections of the second shielding electrode bar 110 and the data line 103 on the first substrate 100 do not overlap, so that the electric field shielding area can be further increased, thereby ensuring a good shielding effect.

In an embodiment, the second shielding electrode bar 110 may be disposed adjacent to the pixel electrode bar 107, and a third gap S3 is provided between the second shielding electrode bar 110 and the pixel electrode bar 107. Although an electric field can be formed between the second shielding electrode bar 110 and the pixel electrode bar 107, the shielding effect of the electric field shielding pattern P on the data line 103 is not affected because the electric field is away from the data line 103.

It should be understood that the dimensions of the first gap S1, the second gap S2 and the third gap S3 mentioned above are equal in the row direction X, so as to reduce the difficulty of product design.

Also, the dimensions of the second shielding electrode bar 110, the common electrode bar 106, and the pixel electrode bar 107 in the row direction X may be designed to be equal to reduce the difficulty of product design. The first shielding electrode bar 109 for covering the data line 103 may be slightly wider than the second shielding electrode bar 110, the common electrode bar 106, and the pixel electrode bar 107, so as to facilitate alignment during processing of the transparent electrode layer.

For example, a common signal connecting bar 111 may be included in the transparent electrode layer. The common signal connecting bar 111 may be used to connect the first shielding electrode bar 109, the second shielding electrode bar 110 and the common electrode bars 106, to ensure that the first shielding electrode bar 109 and the common electrode bar 106 simultaneously write the same common potential, that is, the common signal connecting bar 111, the first shielding electrode bar 109, the second shielding electrode bar 110 and the common electrode bars 106 are connected together as common electrodes.

In this embodiment, the array substrate may further include a light shielding portion 112 formed on the first substrate 100. The light shielding portion 112 may be provided on opposite sides of each data line 103 in the row direction X. It should be understood that there is a gap between the orthographic projections of the light shielding portion 112 and the data line 103 on the first substrate 100.

A portion of the light shielding portion 112 overlaps with the third gap S3 on the first substrate 100. A portion of the light shielding portion 112 overlaps an edge region of the pixel electrode bar 107 close to the second shielding electrode bar 110 on the first substrate 100. That is, the light shielding portion 112 shields the third gap S3, which may be completely shielded or may be a part of the third gap S3, and the light shielding portion 112 also shields an edge area of the pixel electrode bar 107 close to the second shielding electrode bar 110. Since the edge electric field at the edge between the pixel electrode bar 107 and the second shielding electrode bar 110 is closer to the data line 103 than the middle electric field, the deflection of liquid crystal molecules here may be disturbed due to the influence of the structure of the data line 103 or the like. Based on this, the edge region of the pixel electrode bar 107 close to the second shielding electrode bar 110 is shielded by the light shielding portion 112, so that the liquid crystal molecules in the edge electric field region here can be shielded, and the display effect can be improved.

For example, the light shielding portion 112 may be made of a metal material and may be used to block the light emitted by the backlight module from passing through. Specifically, the light shielding portion 112 may be arranged in the same layer as the gate of the transistor 101 to reduce the number of masks and reduce the cost. The light shielding portion 112 is spaced from the gate and the scan line 102. That is, the light shielding portion 112 does not have the same potential as the gate and the scan line 102.

It should be understood that this embodiment may also include a common signal trace 113 disposed in the same layer as the gate and the scan line 102. The common signal trace 113 is used for providing a common potential. The aforementioned common signal connecting bar 111 is connected to the common signal trace 113 through a via passing through the insulating layer.

The array substrate also includes a color film layer 114. The color film layer 114 may be located between the transparent electrode layer and the driver layer, and in particular between the passivation layer 105 and the transparent electrode layer.

After fabricating the color film layer 114 and before fabricating the transparent electrode layer, another planarization layer 115 can be fabricated. By performing the planarization treatment on the substrate before fabricating the transparent electrode layer, the difficulty of fabricating the subsequent transparent electrode layer can be reduced.

Embodiment 2

Figure 3:
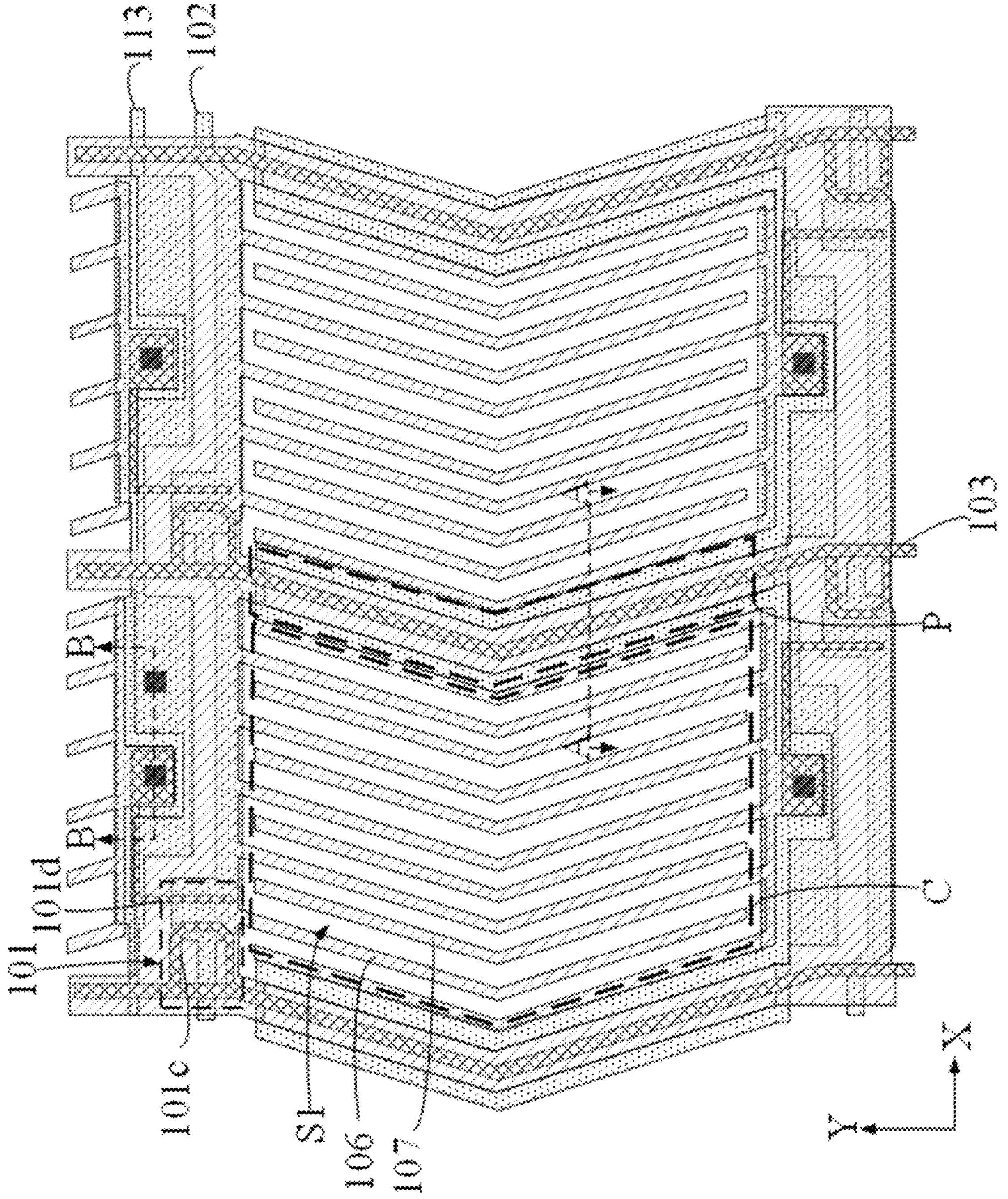
FIG. 3 is a plan view of an array substrate according to embodiment 2 of the present disclosure.
Figure 4:
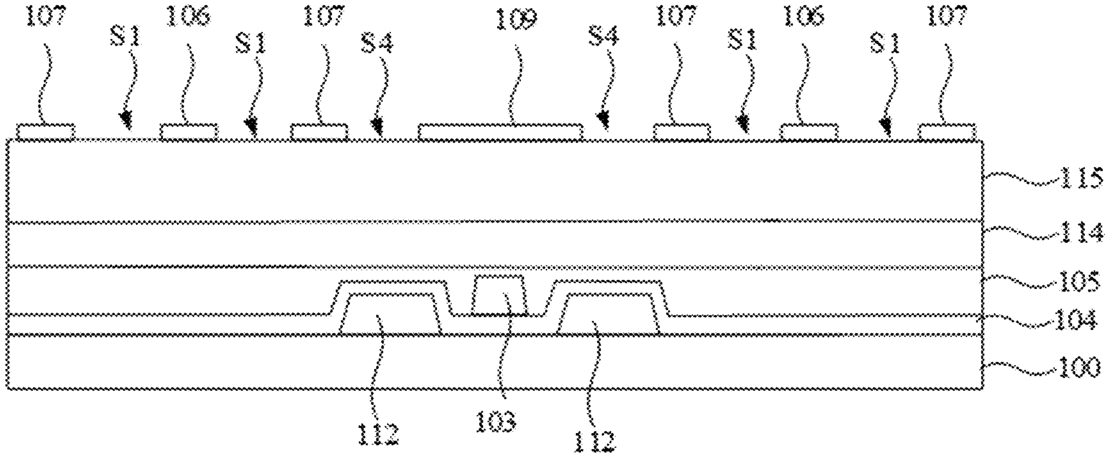
FIG. 4 is a sectional view in an A-A direction shown in FIG. 3.
Figure 5:
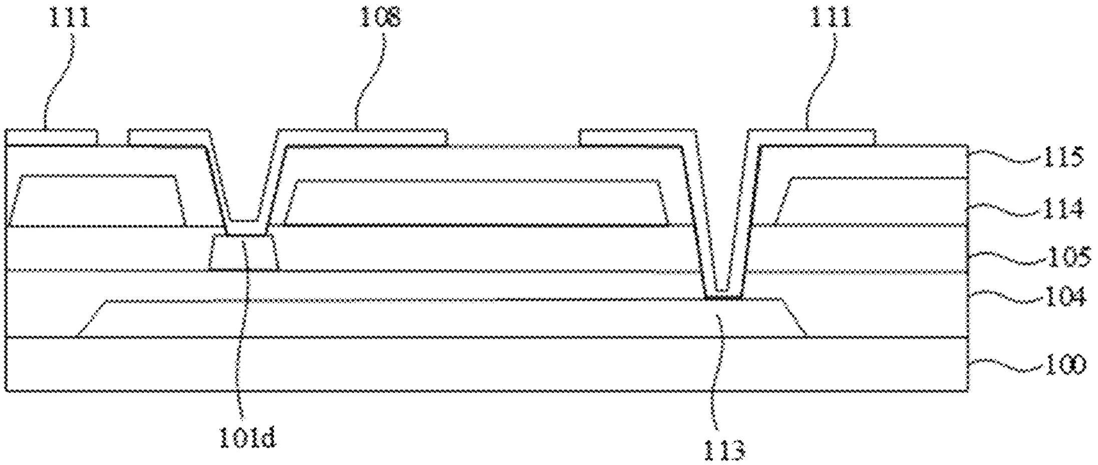
FIG. 5 is a sectional view in a B-B direction shown in FIG. 1 or FIG. 3.

As shown in FIGS. 3 to 5, the main difference between embodiment 2 and embodiment 1 is that the electric field shielding pattern P includes only the first shielding electrode bar 109 and does not include the second shielding electrode bar 110, that is, the first shielding electrode bar 109 is disposed adjacent to the pixel electrode bar 107, and a fourth gap S4 is provided between the first shielding electrode bar 109 and the pixel electrode bar 107.

Since the potential of the first shielding electrode bar 109 is different from that of the pixel electrode bar 107, a certain electric field is generated. In order to prevent the electric field from affecting the light shielding effect, the light shielding portion 112 can shade the fourth gap S4, so that even if the liquid crystal molecules are deflected here, the light shielding portion 112 has light shielding performance and can block light from passing through here, so that shielding by BM layer is unnecessary here.

Specifically, the orthographic projection of the light shielding portion 112 on the first substrate 100 covers the fourth gap S4 and the edge areas of the pixel electrode bar 107 and the first shielding electrode bar 109 to further ensure the shielding effect.

In this embodiment, the fourth gap S4 and the first gap S1 are of the same dimensions in the row direction X to reduce design difficulty.

It should be noted that besides the above-mentioned features that are different from embodiment 1, other features of the embodiment 2 are similar to embodiment 1, which will not be repeated here.

Embodiment 3

Figure 6:
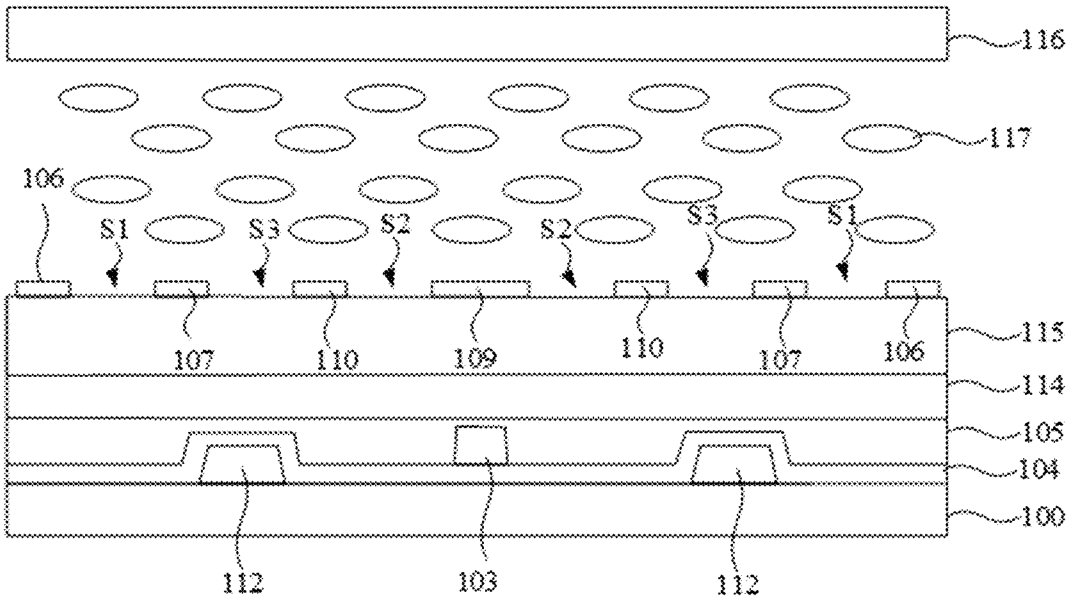
FIG. 6 is a cross-sectional view of a section of a display panel according to embodiment 3.

This embodiment provides a display panel, in addition to the array substrate described in embodiment 1 or embodiment 2, as shown in FIG. 6, the display panel may also include a counter substrate and a liquid crystal layer 117. The array substrate and the counter substrate are disposed by cell assembling, and the liquid crystal layer 117 is sandwiched between the array substrate and the counter substrate, that is, the display panel may be a liquid crystal display panel.

Figure 7:
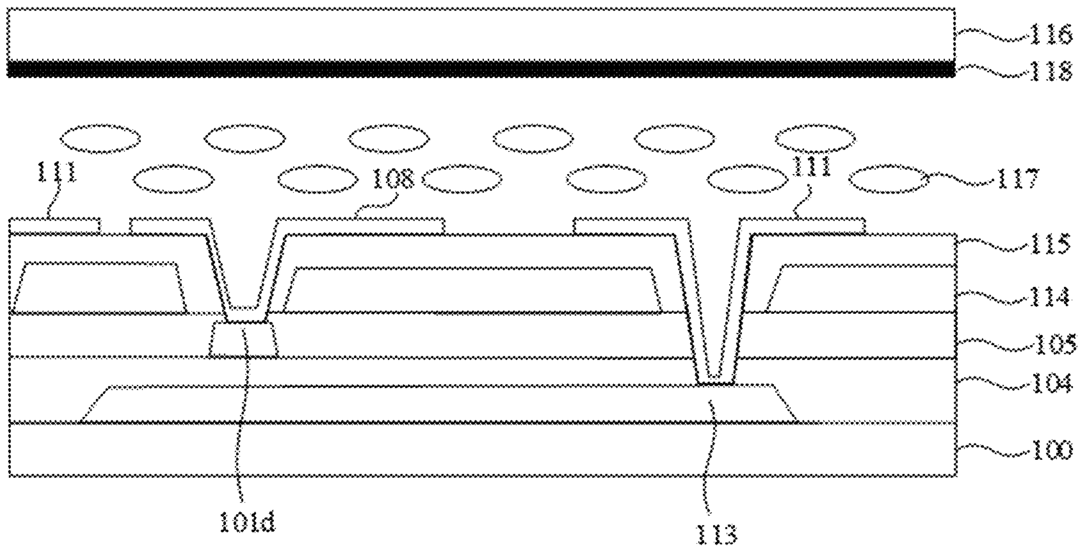
FIG. 7 is a cross-sectional view of another section of the display panel of embodiment 3.

As shown in FIG. 7, the counter substrate may include a second substrate 116 and a black matrix 118 located on the side of the second substrate 116 close to the array substrate. The orthographic projections of the black matrix 118 and the electric field shielding pattern on the first substrate 100 do not overlap, as shown in FIG. 6. That is to say, the electric field shielding pattern can be shielded without providing a black matrix above it. By reducing the use of BM for shielding the data line 103, this embodiment reduces a series of process problems caused by BM alignment accuracy, which is of great significance to the improvement of the panel manufacturing process and the panel quality. In addition, since the use of BM for shielding the data line 103 is reduced, the pixel aperture ratio can also be appropriately increased.

It should be understood that although the black matrix above the data line 103 is reduced, the use of a black matrix is required, and this black matrix 118 is mainly used to block areas such as the scan line 102, the transistor 101, the common signal trace 113, and the non-display area, as shown in FIG. 7.

The display panel of the embodiment of the present disclosure can coordinate with the backlight module to form a liquid crystal display, which can be applied to electronic devices such as televisions, mobile phones, flat panels, notebook computers and the like, and will not be described here.

In the description of this description, illustrations of the reference terms "some embodiments", "exemplified", etc. mean that specific features, structures, materials, or features described in connection with the embodiment or example are included in at least one embodiment or example of the present disclosure. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although the embodiments of the present disclosure have been shown and described above, understandably, the above-described embodiments are exemplary and cannot be construed as limiting the present disclosure. Those of ordinary skill in the art may make changes, modifications, substitutions and modifications to the above-described embodiments within the scope of the present disclosure. Therefore, any changes or modifications made in accordance with the claims and descriptions of the present disclosure should fall within the scope of the present disclosure.

What is claimed is:

1. An array substrate comprising:

a first substrate;

a driver layer comprising a data line; and a transparent electrode layer provided at a side of the driver layer away from the first substrate in an insulating manner, comprising:

a plurality of electric field generating patterns arranged in an array, the electric field generating pattern comprising a plurality of common electrode bars and a plurality of pixel electrode bars alternately arranged in a row direction with a first gap therebetween; and an electric field shielding pattern located between adjacent two columns of electric field generating patterns, and spaced from the electric field generating pattern, and the electric field shielding pattern is configured to write the same common potential as the common electrode bar;

wherein the electric field shielding pattern comprises a first shielding electrode bar for writing the common potential, the first shielding electrode bar covering the data line, and wherein in the row direction, opposite sides of the data line are inwardly retracted with respect to two sides of the first shielding electrode bar; and wherein the electric field shielding pattern further comprises a second shielding electrode bar located at each of two sides of the first shielding electrode bar in the row direction, the second shielding electrode bars being configured to write the common potential, and wherein a second gap is provided between the second shielding electrode bar and the first shielding electrode bar.

2. The array substrate according to claim 1, wherein the second shielding electrode bar is arranged adjacent to the pixel electrode bar, and a third gap is provided between the second shielding electrode bar and the pixel electrode bar.

3. The array substrate according to claim 2, wherein the array substrate further comprises a light shielding portion formed on the first substrate, and the light shielding portion being provided on opposite sides of each data line in the row direction;

wherein a part of the light shielding portion and the third gap overlap on the first substrate, and a part of the light shielding portion overlaps on the first substrate with an edge area of the pixel electrode bar close to the second shielding electrode bar.

4. The array substrate according to claim 3, wherein the driver layer further comprises a transistor located at a side of the transparent electrode layer close to the first substrate, wherein a gate of the transistor is spaced from the light shielding portion and arranged in the same layer, a source and a drain of the transistor are arranged in the same layer as the data line, the source is connected to the data line, and the drain is connected to the pixel electrode bar.

5. The array substrate according to claim 3, wherein the array substrate further comprises a color film layer located between the transparent electrode layer and the driver layer.

6. The array substrate according to claim 3, wherein the driver layer further comprises a transistor located at a side of the transparent electrode layer close to the first substrate, wherein a gate of the transistor is spaced from the light shielding portion and arranged in the same layer, a source and a drain of the transistor are arranged in the same layer as the data line, the source is connected to the data line, and the drain is connected to the pixel electrode bar, and wherein the array substrate further comprises a color film layer located between the transparent electrode layer and the driver layer.

7. The array substrate according to claim 2, wherein the first gap, the second gap and the third gap are of equal dimensions in the row direction.

8. The array substrate according to claim 1, wherein the first shielding electrode bar is arranged adjacent to the pixel electrode bar, and a fourth gap is provided between the first shielding electrode bar and the pixel electrode bar; and wherein the array substrate further comprises a light shielding portion formed on the first substrate, the light shielding portion being provided on opposite sides of each data line in the row direction, and the light shielding portion shielding the fourth gap.

9. The array substrate according to claim 8, wherein an orthographic projection of the light shielding portion on the first substrate covers the fourth gap and edge areas of the pixel electrode bar and the first shielding electrode bar.

10. The array substrate according to claim 8, wherein the fourth gap and the first gap are of equal dimensions in the row direction.

11. The array substrate according to claim 8, wherein an orthographic projection of the light shielding portion on the first substrate covers the fourth gap and edge areas of the pixel electrode bar and the first shielding electrode bar, and wherein the fourth gap and the first gap are of equal dimensions in the row direction.

12. The array substrate according to claim 8, wherein the driver layer further comprises a transistor located at a side of the transparent electrode layer close to the first substrate, wherein a gate of the transistor is spaced from the light shielding portion and arranged in the same layer, a source and a drain of the transistor are arranged in the same layer as the data line, the source is connected to the data line, and the drain is connected to the pixel electrode bar.

13. The array substrate according to claim 8, wherein the array substrate further comprises a color film layer located between the transparent electrode layer and the driver layer.

14. The array substrate according to claim 8, wherein the driver layer further comprises a transistor located at a side of the transparent electrode layer close to the first substrate, wherein a gate of the transistor is spaced from the light shielding portion and arranged in the same layer, a source and a drain of the transistor are arranged in the same layer as the data line, the source is connected to the data line, and the drain is connected to the pixel electrode bar, and wherein the array substrate further comprises a color film layer located between the transparent electrode layer and the driver layer.

15. A display panel comprising:

a counter substrate;

a liquid crystal layer; and an array substrate, comprising:

a first substrate;

a driver layer comprising a data line; and a transparent electrode layer provided at a side of the driver layer away from the first substrate in an insulating manner, comprising:

a plurality of electric field generating patterns arranged in an array, the electric field generating pattern comprising a plurality of common electrode bars and a plurality of pixel electrode bars alternately arranged in a row direction with a first gap therebetween; and an electric field shielding pattern located between adjacent two columns of electric field generating patterns, and spaced from the electric field generating pattern, and the electric field shielding pattern is configured to write the same common potential as the common electrode bar wherein the electric field shielding pattern comprises a first shielding electrode bar for writing the common potential, the first shielding electrode bar covering the data line, and wherein in the row direction, opposite sides of the data line are inwardly retracted with respect to two sides of the first shielding electrode bar;

wherein the electric field shielding pattern further comprises a second shielding electrode bar located at each of two sides of the first shielding electrode bar in the row direction, the second shielding electrode bars being configured to write the common potential, and wherein a second gap is provided between the second shielding electrode bar and the first shielding electrode bar; and wherein the array substrate and the counter substrate are arranged by cell assembling, and the liquid crystal layer is sandwiched between the array substrate and the counter substrate.

16. The display panel according to claim 15, wherein the counter substrate further comprises a second substrate and a black matrix located on one side of the second substrate close to the array substrate, and wherein there is non-overlapping between orthographic projection of the black matrix and orthographic projection of the electric field shielding pattern on the first substrate.

* * * * *